United States Patent [19]

Yoshii

[11] Patent Number: 5,081,448
[45] Date of Patent: Jan. 14, 1992

[54] DIFFERENTIAL PRESSURE INDICATOR WITH TEMPERATURE COMPENSATION

[75] Inventor: Kensuke Yoshii, Kiyose, Japan

[73] Assignee: Wako Industrial Co., Ltd., Tokyo, Japan

[21] Appl. No.: 609,178

[22] Filed: Nov. 5, 1990

[30] Foreign Application Priority Data

Nov. 10, 1989 [JP] Japan ............................ 1-131285[U]

[51] Int. Cl.[5] ............................................. G08B 21/00
[52] U.S. Cl. .................................... 340/611; 340/626;
340/607; 73/708; 73/861.42; 200/81.9 R
[58] Field of Search ..................... 340/607, 626, 611;
73/861.42, 708, 38; 200/81 R, 81.9 R

[56] References Cited

U.S. PATENT DOCUMENTS 3,239,622  3/1966  Clason ..................... 200/81 R X

FOREIGN PATENT DOCUMENTS 64-10640  1/1989  Japan .
718788    2/1980  U.S.S.R. .

Primary Examiner—Jin F. Ng
Assistant Examiner—Jeffery A. Hofsass
Attorney, Agent, or Firm—Robert W. J. Usher

[57] ABSTRACT

An oil filter for filtering oil is combined with a differential pressure indicator with temperature compensation. The differential pressure indicator has a spool assembly slidably disposed in a spool insertion cylinder in axially confronting relation to a terminal which is connected through a warning lamp to a battery. The spool assembly comprises a spool body disposed for axial sliding movement in the spool insertion cylinder, a contact member disposed for axial sliding movement in the spool body and having a contact pin movable out of one of the spool body, and a spring of a shape-memory alloy, restorable to a memorized shape when the oil is in a predetermined temperature range, for biasing the contact member to move the contact pin out of the spool body towards the terminal. When a differential pressure in excess of a predetermined level is developed in the oil and applied to the spool assembly, the differential pressure acts to move the spool assembly towards the terminal. The contact pin is brought into electric contact with the terminal only when the shape-memory spring restores its memorized shape at the time the oil is in the predetermined temperature range.

5 Claims, 3 Drawing Sheets

DIFFERENTIAL PRESSURE INDICATOR WITH TEMPERATURE COMPENSATION

BACKGROUND OF THE INVENTION

The present invention relates to a differential pressure indicator for use with an oil filter or the like, for electrically detecting when a differential pressure across a filter element exceeds a predetermined level because of a growing mass of particles trapped in the filter element.

Oil filters are provided in oil passages and used to filter, or remove contaminant particles from, oil flowing the through the oil passages thereby purifying the oil. An oil filter has a filter element which is usually made of paper. The filter element removes or separates suspended particulate matter such as dust particles or impurities from oil which flows through the filter element. As the filter element is used over a long period of time, trapping a large amount of contaminant particles, the filter element tends to become clogged by the trapped contaminant. When the filter element is clogged to a certain extent, it has to be replaced with a new one. Usually, the filter element is replaced at intervals of time determined by the regular maintenance schedules of an apparatus such as an engine, a hydraulic pressure device, or the like with which the oil filter is associated. According to such replacement practice, however, the filter element is replaced irrespective of the extent to which it is actually clogged. For example, even if a filter element has not yet been contaminated enough and does not require replacement, it will nevertheless be replaced with a new one when the scheduled time for replacement is reached. Such procedure is undesirable because the filter element, which is still useful, is wasted. Conversely, even if the contamination of a filter element is too great, requiring replacement immediately, no replacement will be carried out unless the scheduled replacement time is reached. This is also not a desirable procedure because the apparatus associated with the oil filter may be adversely affected by the excessive clogging of the filter element.

For proper detection of filter element clogging, it has been proposed to use a differential pressure indicator for detecting a differential pressure which has been developed across a filter element by the clogging of the filter element. When the filter element has been progressively clogged to the extent that the differential pressure exceeds a predetermined level, the differential pressure is electrically detected by the differential pressure indicator. Such detection of the differential pressure then indicates that the filter element should be replaced with a new one.

One problem associated with use of the differential pressure indicator is that since any differential pressure in excess of the predetermined level is automatically detected, the differential pressure indicator is actuated even when such a differential pressure is developed by causes other than the clogging of the filter element. For example, when the oil flowing through the oil filter has a high degree of viscosity at low temperature, the differential pressure across the filter element is increased even if the filter element is not clogged, and the differential pressure indicator detects the increase in the differential pressure and issues an alarm, producing a false indication of the clogging of the filter element.

SUMMARY OF THE INVENTION

In view of the aforesaid drawbacks of the conventional differential pressure indicator, it is an object of the present invention to provide a differential pressure indicator which has a temperature compensating function enabling it to accurately detect the clogging of a filter element through detection of a differential pressure across the filter element only when the temperature of a fluid, i.e., oil to be filtered by an oil filter, is higher than a predetermined temperature, based on the fact that the temperature of the oil is above a predetermined high temperature under normal conditions in which the oil filter is used.

According to the present invention, there is provided a differential pressure indicator for detecting a differential pressure developed across a point in a fluid, comprising a body adapted to be positioned at the point in the fluid, the body including a main body component having an axial spool insertion cylinder defined therein, and a terminal disposed at one end of the spool insertion cylinder and electrically insulated from the main body component, a spool assembly slidably disposed in the spool insertion cylinder in axially confronting relation to the terminal, and first biasing means for normally biasing the spool assembly in a direction away from the terminal, the spool assembly comprising a spool body for axial sliding movement disposed in the spool insertion hole, a contact member axially slidably disposed in the spool body and having a contact pin movable out of one end of the spool body, second biasing means for normally biasing the contact member in a direction to retract the contact pin into the spool body, and third biasing means, restorable to a memorized shape when the fluid is in a predetermined temperature range, for biasing the contact member to move the contact pin out of the one end of the spool body against the bias of the second biasing means, the main body component having a pair of passages defined therein for introducing the fluid into the spool insertion cylinder to apply a differential pressure across the spool assembly, whereby, when a differential pressure in excess of a predetermined level is developed in the fluid introduced through the passage into the spool insertion cylinder through the passages, the predetermined differential pressure is applied across the spool assembly to move the spool assembly toward the terminal against the bias of the first biasing means.

The above and other objects, features and advantages of the present invention will become more apparatus from the following description when taken in conjunction with the accompanying drawings in which a preferred embodiment of the present invention is shown by way of illustrative example.

DETAILED DESCRIPTION OF THE PREFERRED EMBODIMENT

Figure 1:
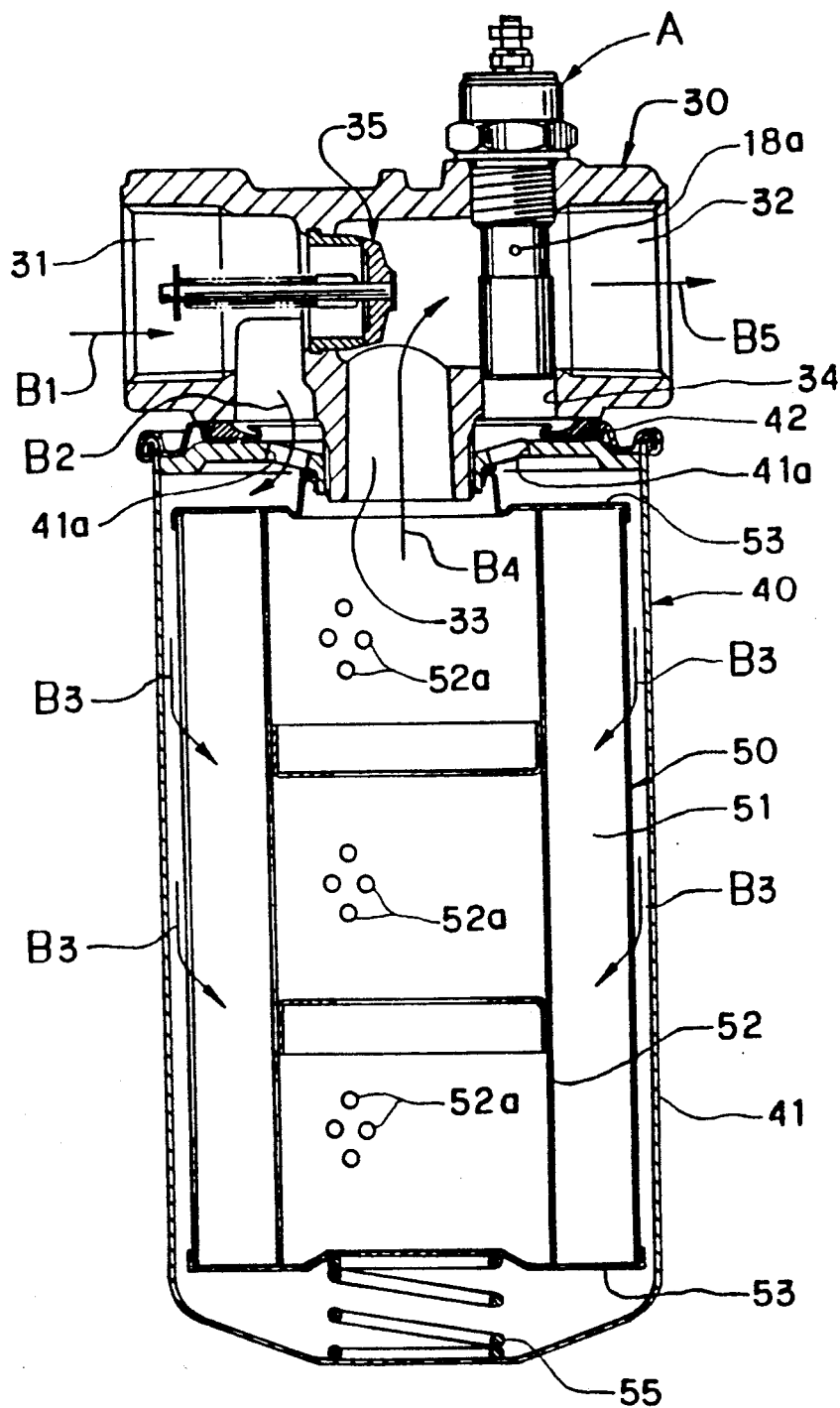
FIG. 1 is a cross-sectional view of an oil filter combined with a differential pressure indicator with temperature compensation according to the present invention.

FIG. 1 shows an oil filter combined with a differential pressure indicator A with temperature compensation, according to the present invention. The oil filter comprises a head 30 in the form of a machined casting, and an oil element assembly 40 threadedly coupled to a lower surface of the head 30. The head 30 has an inlet port 31 defined in a lefthand side (as shown in FIG. 1) thereof, an outlet port 32 defined in a righthand side thereof, and a central port 33 defined in a tubular member projecting downwardly from a lower side thereof in communication with the outlet port 32, the central port 33 opening downwardly.

The filter element assembly 40 has a casing 41 and a filter element 50 housed in the casing 41. The casing 41 is threaded over the tubular member in which the central port 33 is defined, so that the casing 41 is fastened to the lower surface of the head 30. The filter element 50 comprises a filter paper body 51 having a plurality of angularly spaced pleats projecting radially outwardly and clamped between upper and lower end caps 53 and supported on and around a cylindrical central tube 52. The filter element 50 is normally urged upwardly by a spring 55 placed on the bottom of the casing 41 and acting on the lower end cap 53.

When the filter element assembly 40 is fastened to the head 30, the lower surface of the head 30 and the upper surface of the filter element assembly 40 are tightly pressed qgainst each other with an annular seal 42 interposed therebetween. The inlet port 31 of the head 30 then communicates through the seal 42 and a ring of communication holes 41a defined in the casing 41, with a space defined between an inner peripheral surface of the casing 41 and an outer peripheral surface of the filter element 50. The filter element 50 has a central space defined by a central tube 52 and communicating with the outlet port 32 of the head 30 through the central port 33 thereof.

When oil is supplied to the inlet port 31 from a hydraulic pump or the like in the direction indicated by the arrow B1, the oil flows through the ring of communication holes 41a in the direction indicated by the arrow B2 into the space between the inner peripheral surface of the casing 41 and the outer peripheral surface of the filter element 50. After the oil flows through, and hence is filtered by, the filter paper body 51 in the direction indicated by the arrows B3, the oil flows through a plurality of through-holes 52a (only some of the holes 52a are shown in FIG. 1) defined in the central tube 52 into the central space of the filter element 50. Thereafter, the oil flows through the central port 33 into the outlet port 32 in the direction indicated by the arrow B4 and then is discharged from the outlet port 32 in the direction indicated by the arrow B5.

The head 30 houses a check valve 35 disposed in a wall that separates the inlet port 31 from the outlet port 32 and the central port 33, and a differential pressure indicator A with temperature compensation which is disposed in and across the outlet port 32. The check valve 35 has a relief valve function such that it is opened when the difference between the oil pressure in the inlet port 31 and the oil pressure in the outlet port 32 exceeds a predetermined level as a result of the clogging of the filter paper body 51 of the filter element 50. When the pressure difference exceeds such a predetermined level, the check valve 35 is opened to allow the oil to flow therethrough from the inlet port 31 to the outlet port 32 bypassing the filter element 50, thereby protecting the filter element 50 against excessive pressure.

The differential pressure indicator A serves to electrically detect when the difference between the oil pressures in the inlet and outlet ports 31, 32 exceeds a predetermined level. The differential pressure indicator A will now be described as to structure and operation with reference to FIGS. 2A and 2B.

Figure 2A:
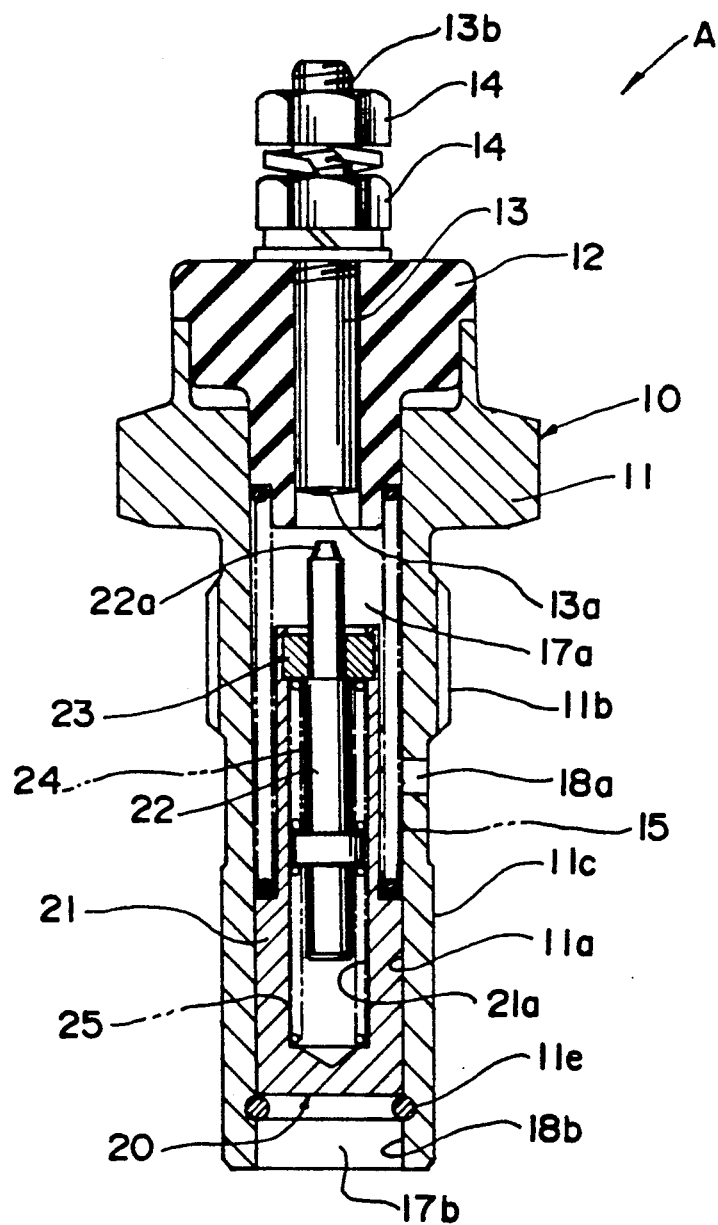
FIGS. 2A and 2B are enlarged cross-sectional views of the differential pressure indicator shown in FIG. 1, the views showing position of different parts at different temperatures.
Figure 2B:
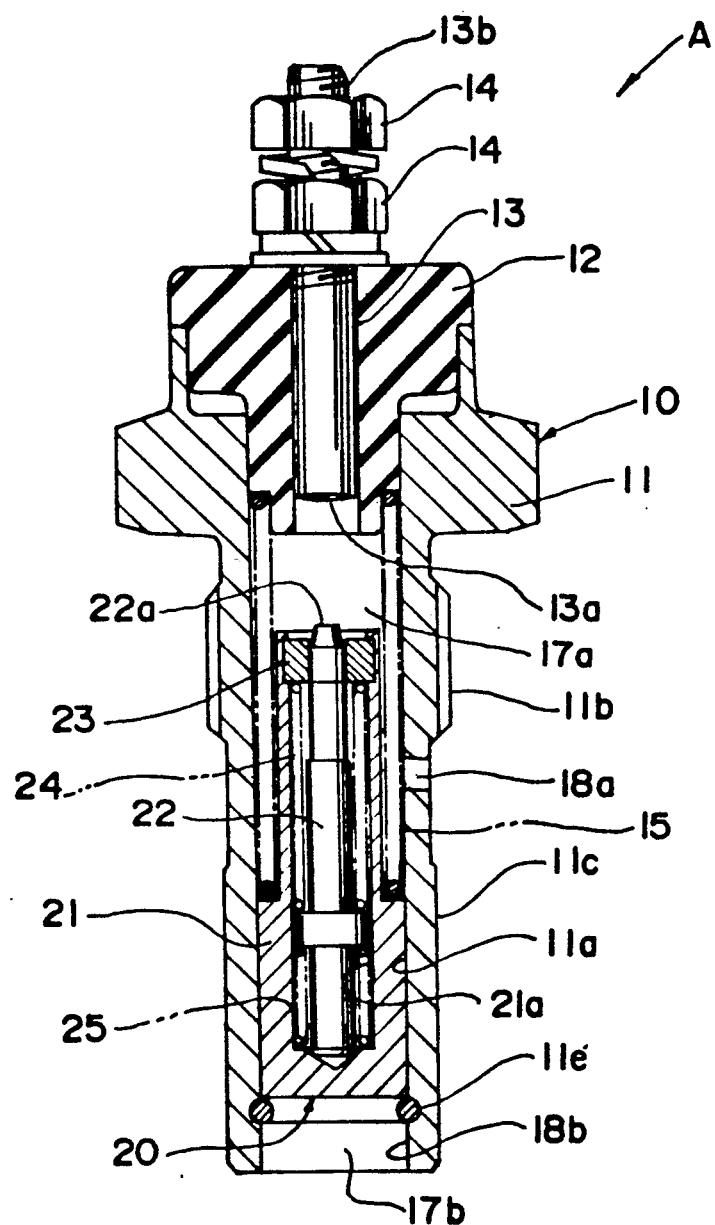

As shown in FIGS. 2A and 2B, the differential pressure indicator A comprises a body 10 having threads 11b threaded into the head 30, a spool assembly 20 slidably disposed vertically or axially in an axial spool insertion cylinder 11a which is vertically or axially defined in the body 10, and a first spring 15 disposed in the spool insertion cylinder 11a for normally urging the spool assembly 20 downwardly with a lower end thereof held against a stopper 11e in a lower end of the body 10.

The body 10 comprises a main body component 11 made of an electrically conductive material with the spool insertion cylinder 11a defined therein, an insulating member 12 of an electrically nonconductive material such as a ceramic material, e.g., alumina, which is hermetically joined to the main body component 11 by brazing at the outer end, (upper end as shown), of the spool insertion cylinder 11a, and an electrically conductive terminal 13 extending axially through the insulating member 12 and hermetically joined to the insulating member 12 by brazing. The terminal 13 has an upper end 13b projecting outwardly of the insulating member 12 and externally threaded with nuts 14 threaded thereover for connection to an electric wire.

The spool assembly 20 has a spool body 21 vertically slidably disposed in the spool insertion cylinder 11a in the main body component 11. The spool body 21 is normally urged downwardely by the first spring 15 acting thereon. The spool body 21 has a contact insertion hole 21a defined axially and vertically therein and opening upwardly. A contact member 22 is inserted for vertical sliding movement in the contact insertion hole 21a. The contact member 22 has an upwardly extending contact pin 22a which can project upwardly through a central hole defined in a cover 23 which closes the upper open end of the contact insertion hole 21a.

Within the contact insertion hole 21a, there are disposed an upper second spring 24 for normally urging the contact member 22 downwardly and a lower third spring 25 for biasing urging the contact member 22 upwardly. The second spring 24 comprises an ordinary compression spring. The third spring 25 comprises a spring made of a shape-memory alloy. At lower temperatures, the third spring 25 is compressed under the bias of the second spring 24 as shown in FIG. 2B. At higher temperatures, the third spring 25 assumes a memorized shape, i.e., is extended against the bias of the second spring 24 to push the contact member 22 upwardly as shown in FIG. 2A. Therefore, when the oil around the third spring 25 is at lower temperatures, the contact pin 22a is retracted as shown in FIG. 2B, and when the oil around the third spring 25 is at higher temperatures, the contact pin 22a projects upwardly as shown in FIG. 2A. The lower temperatures referred to above fall in a temperature range of working oil in the oil filter when the apparatus associated with the oil filter starts to operate, and are substantially the same as normal ambient temperatures. The higher temperatures fall in a temperature range in which the working oil is usually used during operation of the apparatus associated with the oil filter.

The spool insertion cylinder 11a in the body 10 of the spool assembly 20 is vertically divided by the spool body 21 into a chamber 17a above the spool body 21 and a lower compartment 17b below the spool body 21. The main body component 11 has a first passage 18a defined through a side wall thereof in communication with the upper chamber 17a. The main body component 11 also has a second passage 18b in communication with the lower compartment defined in the lower end thereof by an axial extension of a peripheral wall of the compartment 17b, the second passage 18b opening downwardly. As shown in FIG. 1, the first passage 18a communicates with the outlet port 32, so that the pressure of the oil in the outlet port 32, i.e., downstream of the filter element 50, is introduced into the upper chamber 17a. The main body component 11 of the body 10 has a lower portion 11c with the second passage 18b defined in the lower end thereof. The lower portion 11c is fitted in a hole 34 defined in the head 30 when the differential pressure indicator A is disposed across the outlet port 32. The hole 34 is retained in communication through the ring of communication holes 41a with the space defined between the inner peripheral surface of the casing 41 and the outer peripheral surface of the filter element 50. Therefore, the lower compartment 17b communicates through the second passage 18b, the hole 34, and the ring of communication holes 41a with the space defined between the inner peripheral surface of the casing 41 and the outer peripheral surface of the filter element 50. As a result, the pressure of the oil in the inlet port 31, i.e., upstream of hte filter element 50, is introduced into the lower chamber 17b.

Operation of the differential pressure indicator A will now be described below. As the working oil is filtered by the filter element 50, the filter paper body 51 becomes progressively clogged by particulate matter or contaminant particles trapped by the filter paper body 51. While the filter paper body 51 is becoming clogged by an increasing amount of particulate matter, the pressure difference between the inlet port 31 and the outlet port 32 becomes progressively higher, i.e., the pressure of the oil in the inlet port 31 becomes higher than the pressure of the oil in the outlet port 32. The different pressures in the inlet and outlet ports 31, 32 are communicated respectively, through the second and first passages 18b, 18a into the lower and upper chambers 17b, 17a and act on the lower and upper surfaces of the spool assembly 20. The pressure difference which is developed across the spool assembly 20 tends to push the spool assembly 20 upwardly against the bias of the first spring 15. When the differential pressure is in excess of a predetermined level with the working oil also being at a higher temperature, the spool assembly 20 is moved upwardly, so that the contact pin 22a which projects upwardly as shown in FIG. 2A is brought into contact with a lower end 13a of the terminal 13.

Since the terminal 13 is electrically insulated from the main body component 11 by the insulating member 12, the terminal 13 and the main body component 11 will not be electrically connected to each other unless the contact member 22 is brought into electrical contact with the terminal 13. Therefore, the differential pressure in excess of a predetermined level can be detected when the electric connection between the terminal 13 and the main body component 11 arising from the electrical contact between the terminal 13 and the contact member 22 is detected. More specifically, an electric wire extending from a battery is connected through a warning lamp, for example, to the upper end 13b of the terminal 13, and the main component body 11 of the body 10 is grounded through the head 30. When the differential pressure between the inlet and outlet ports 31, 32 exceeds the predetermined level bringing the contact member 22 into electric contact with the lower end 13a of the terminal 13, an electric current flows from the battery to ground through the terminal 13, the contact 22, and the body 10, so that the warning lamp is energized. Accordingly, the user of the apparatus associated with the oil filter can know when to replace the filter element 50.

When the oil is still at a lower temperature, as when the apparatus starts to operate, the contact pin 22a is retracted as shown in FIG. 2B. Therefore, even if the differential pressure between the inlet and outlet ports 31, 32 exceeds the predetermined level, moving the spool assembly 20 upwardly, the contact pin 22a remains spaced from, and hence out of electic contact with, the lower end 13a of the terminal 13. At lower oil temperatures, the viscosity of the working oil is so high that a differential pressure in excess of the predetermined level tends to be developed between the inlet and outlet ports 31, 32 even if the filter element 50 is not clogged enough. In this case, however, the differential pressure indicator A with temperature compensation does not detect such a differential pressure as it is not caused by the clogging of the filter element 50. Therefore, the differential pressure indicator A detects a differential pressure in excess of the predetermined level only when the oil temperature is higher.

While the insulating member 12 brazed to the main body component 11 is made of a ceramic material in the above embodiment, the insulating member 12 may be made of any of another known insulating materials such as BAKELITE (Trade Mark).

Although a specific preferred embodiment has been shown and described, it should be understood that many changes and modifications may be made therein without departing from the scope of the appended claims.

What is claimed is:

1. A differential pressure indicator for detecting and indicating differential pressure developed across a point in a fluid, comprising:

a body adapted for mounting at the point in the fluid, said body including a main body component having an axis and an axially extending spool insertion cylinder defined therein, and a terminal disposed at one axial end of said axially extending spool insertion cylinder and electrically insulated from said main body component;

a spool assembly disposed for said sliding movement in said spol insertion cylinder and in axially confronting relation to said terminal; and first biasing means for biasing said spool assembly axially away from said terminal;

said spool assembly comprising a spool body disposed for axial sliding movement in said axially extending spool insertion cylinder and, a contact member with a contact pin disposed in said spool body for axial sliding movement between axially advanced and axially retracted positions in which the contact pin protrudes from one axial end of said spool body and is retracted within said spool body, respectively, second biasing means for biasing said contact member axially away from said terminal to the retracted position of said contact pin, and third biasing means having a shape-memory restorable when the fluid is in a predetermined termperature range, for biasing said contact member axially towards said terminal, to the advanced position of said contact pin against the bias of said second biasing means;

Indicating circuit means for connection between said terminal and a power source;

said main body component having a pair of passages defined therein for introducing the fluid into said spool insertion cylinder to apply a differential pressure across said spool assembly; whereby when the fluid is in the predetermined temperature range, a differential pressure in excess of a predetermined level developed in the fluid introduced through said passage into said spool insertion cylinder moves said spool assembly with said contact member axially, carrying said contact member with said contact pin towards said terminal against the bias of said first biasing means thereby operating the indicating circuit means.

2. A differential pressure indicator according to claim 1, wherein said indicating circuit means includes a warning lamp and a power supply connected to said terminal through said warning lamp, said contact member being grounded, whereby said differential pressure in excess of said predetermined level moves said spool assembly axially with said contact pin in an advanced position bringing said contact pin into electric contact with said terminal, thereby energizing said warning lamp.

3. A differential pressure indicator according to claim 1, in combination with an oil filter having a filter element and inlet and outlet ports disposed upstream and downstream, respectively, of said filter element, wherein the fluid is oil flowing through said oil filter, said passages are retained in communication with said inolet and outlet ports, respectively, and whereby the oil is introduced from said inlet and outlet ports into said spool insertion cylinder through said passages, respectively.

4. A differential pressure indicator according to claim 3, wherein the oil introduced from said inlet port into said spool insertion cylinder urges said spool assembly axially towards said terminal, and the oil introduced from said outlet port into said spool insertion cylinder urges said spool assembly axially away from said terminal.

5. A differential pressure indicator according to claim 1, wherein said body further includes an insulating member of ceramic material, said terminal being mounted on said main body component by said insulating member.

* * * * *